J. A. SCHERTZ.
HAY SWEEP.
APPLICATION FILED DEC. 28, 1908.
927,883.
Patented July 13, 1909.
3 SHEETS—SHEET 3.
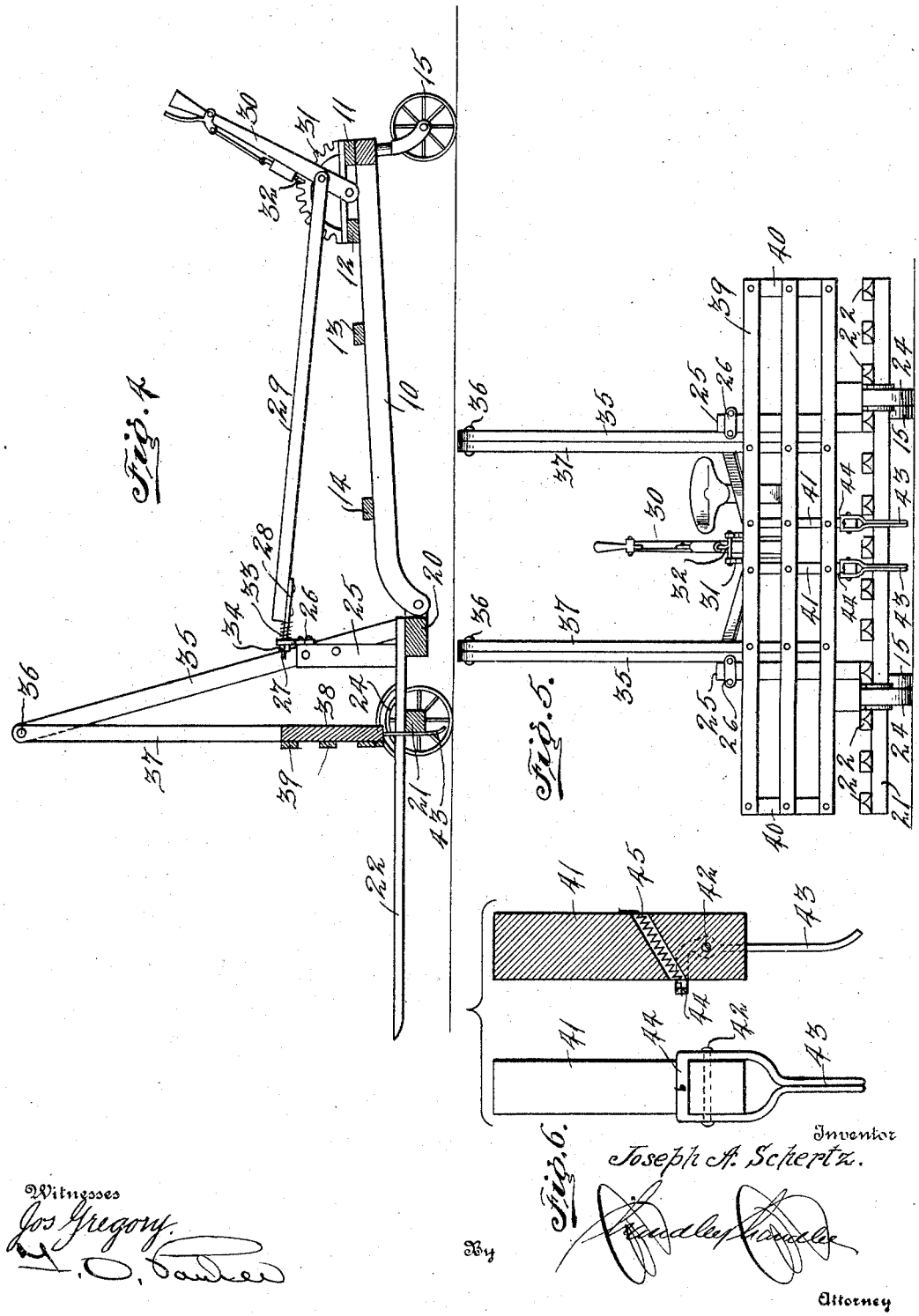

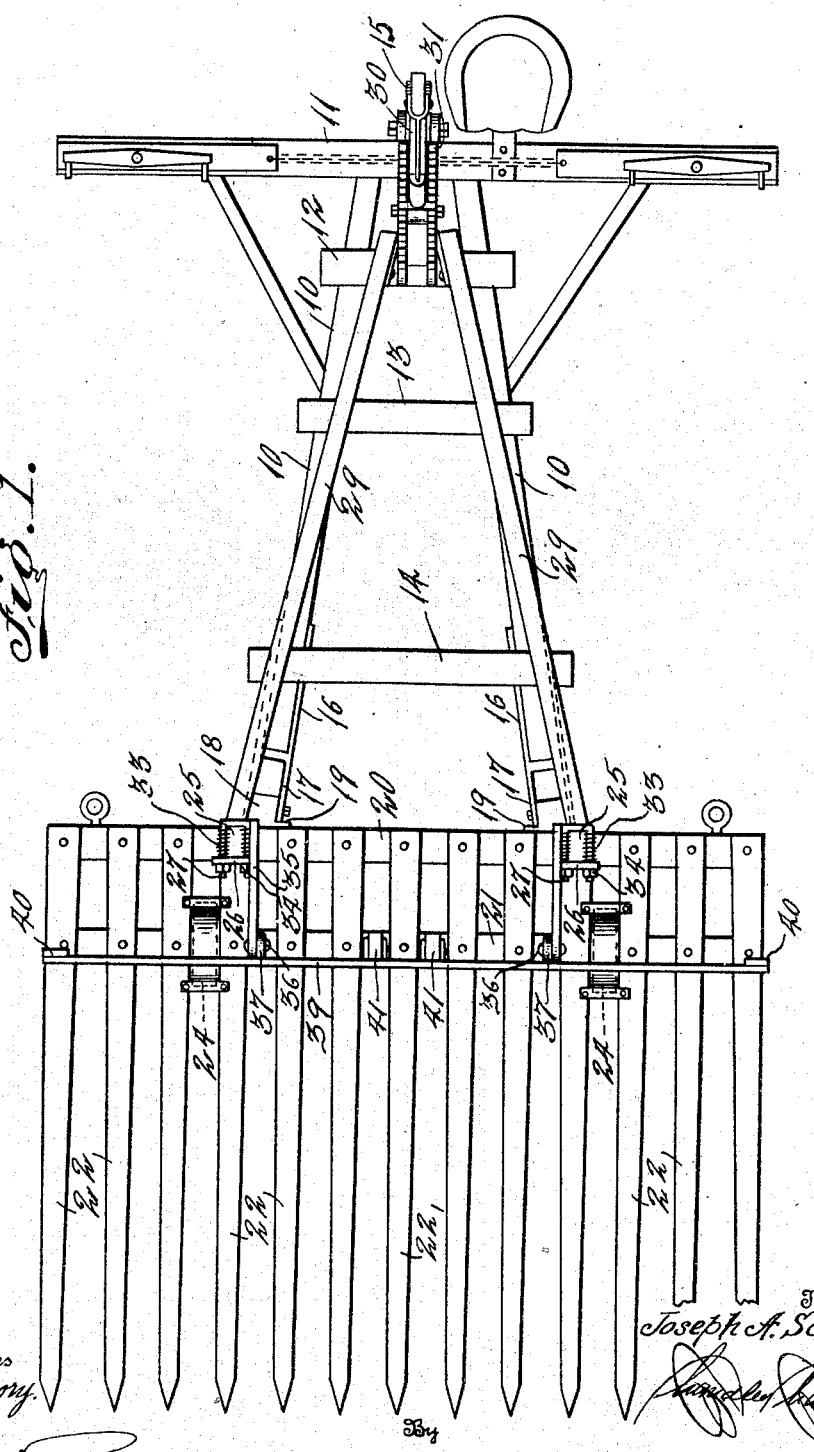

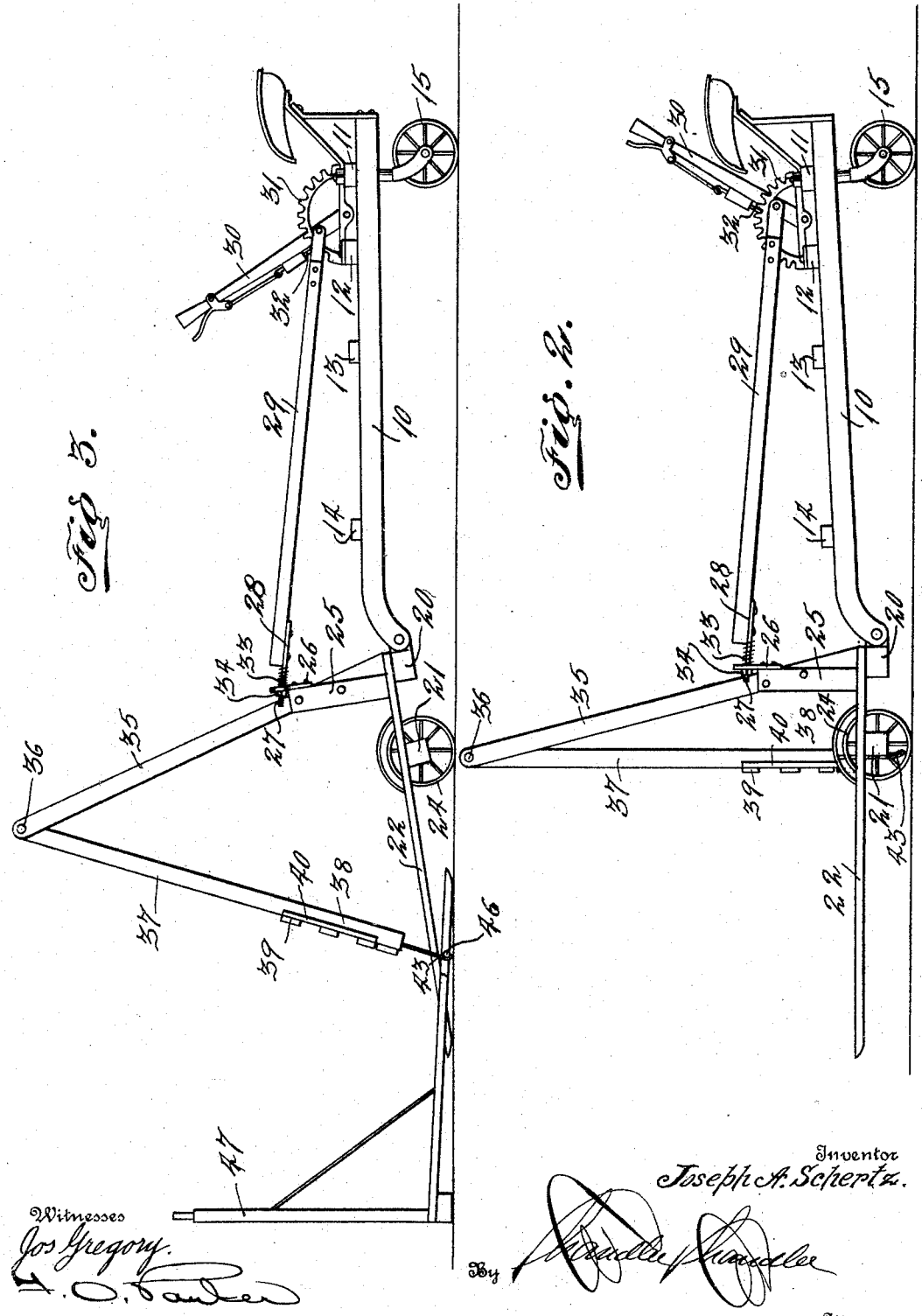

UNITED STATES PATENT OFFICE.

JOSEPH A. SCHERTZ, OF MARQUETTE, NEBRASKA.

HAY-SWEEP.

No. 927,883.   Specification of Letters Patent.   Patented July 13, 1909.

Application filed December 28, 1908. Serial No. 469,697.

*To all whom it may concern:*

Be it known that I, JOSEPH A. SCHERTZ, a citizen of the United States, residing at Marquette, in the county of Hamilton, State of Nebraska, have invented certain new and useful Improvements in Hay-Sweeps; and I do hereby declare the following to be a full, clear, and exact description of the invention, such as will enable others skilled in the art to which it appertains to make and use the same.

The invention relates to hay sweeps and the primary object of the invention is the provision of a hay sweep which comprises a frame, a rake pivoted to the frame for vertical tilting movement, a frame mounted for swinging movement upon the main frame of the sweep and carrying a sweep board, hinged catch members mounted at the lower end of the swinging frame and adapted to be brought in engagement with the cross bars of a hay stacker head so that upon back movement of the sweep a load of hay thereon will be discharged from the sweep.

Another object of the invention is the provision of a hay sweep comprising a frame, a rake pivoted to the frame for vertical tilting movement, a frame mounted for swinging movement upon the rake, means for vertically moving the rake and catch means on the swinging frame to engage a hay stacker head so that upon backing of the sweep a load of hay upon the rake will be discharged therefrom by the swinging frame.

With these and other objects in view the invention consists in the construction, combination and arrangement of parts as will be hereinafter more fully described, illustrated in the accompanying drawings which disclose the preferred form of embodiment of the invention, and brought out in the appended claims. It is to be understood however, that minor changes, variations and modifications may be made such as come properly within the scope of the appended claims without departing from the spirit of the invention.

In the drawings: Figure 1 is a top plan view of the invention. Fig. 2 is a side elevation thereof showing the sweep board and its swinging supporting frame in normal position. Fig. 3 is a similar view showing the catcher members in engagement with a hay stacker head and the sweep board moved forwardly to clear the rake, the latter being tilted to discharge position. Fig. 4 is a vertical longitudinal sectional view through the sweep. Fig. 5 is a front elevation thereof. Fig. 6 is a view showing a front elevation and a longitudinal sectional view through a member carrying the catch device.

Similar reference characters indicate corresponding parts throughout the several views in the drawings.

In the drawings, the hay sweep embodying the invention comprises a frame which is constructed of side sills 10, a rear cross beam 11 which connects the rear ends of the side sills and cross pieces 12, 13 and 14 which are located one in advance of the other. The rear end of the frame is supported for travel by means of a suitable caster wheel 15 swiveled centrally in the rear cross beam 11. A casting 16 is bolted or otherwise secured upon the forward end of each of the side sills 10 of the frame and each of these castings is formed with a pair of spaced ears 17 between which is pivoted an ear 18 formed upon a plate 19 secured to the rear face of the rear cross beam 20 of the rake head, the said rake head including also a cross beam 21 which is located in advance of the beam 20 and teeth or tines 22 which are secured to the said cross beams and project forwardly beyond the cross beam 21 of the rake head. The said cross beam 21 is formed adjacent each end and between certain ones of the tines 22 with a hub and rotatably mounted upon the hubs are wheels 24 which serve to support the rake for travel, it being understood of course that the rake may have a tilting movement with respect to the frame, the wheels acting as fulcrums.

Rising from the rake head at the rear end thereof are uprights 25 upon which at the upper ends thereof are fixed plates 26 having a pair of openings to receive fingers 27 of castings 28 secured to the forward end of converging bars 29 which latter have their opposite ends pivotally connected to a throw lever 30 pivotally mounted at its lower end upon a toothed segment 31 secured and rising vertically from the cross beams 11 and 12 of the frame of the sweep. Mounted upon the throw lever 30 is a suitable manually operable pawl mechanism 32 which is adapted to be brought into locked and unlocked engagement with the toothed segment to hold the throw lever in various adjusted positions, which lever will effect the vertical movement of the rake head when actuated. Surrounding the fingers 27 are tension springs 33 which latter permit slight movement of the fingers in the plates 26 when the throw lever is being actuated and carried by the said fingers are nuts 34 to hold the fingers coupled with the plates 26 mounted at the upper end of the uprights on the rake head.

On the rake head of the sweep and secured in any suitable manner to the cross beam 20 and uprights 25 are forwardly inclined members or beams 35 to the upper ends of which are connected by pivots 36 the swinging arms 37 of a sweep board or frame 38 which latter comprises spaced horizontally disposed bars 39 connected to each other at opposite ends by cross bars 40 so as to form a unitary structure. Secured to and depending from the sweep frame 38 are members 41 which latter extend below the sweep board or frame to opposite sides of the center tine 22 of the rake head.

Pivotally connected as at 42 are catch members 43 each of which is of substantially U shape and to the cross connecting piece 44 thereof is secured one end of a retractile spring 45 the opposite end of which is connected to the depending members 41 so as to normally hold the said catch members 43 in vertical alinement with the sweep frame. The catcher members 43 are adapted to engage the cross bars 46 of a hay stacker head 47 which latter is of the ordinary construction and forms no part of the present invention.

In operation, and presuming that there is a load upon the rake head of the sweep and it is desired to discharge the same from the rake head it is necessary to advance the sweep so as to have the hay rake move a distance over the hay stacker head 47 then the operator actuates the throw lever so as to lower the rake head and upon backing of the sweep the catch members 43 carried by the sweep frame or board will engage the cross bars of the hay stacker head and during the continued backward movement of the sweep the sweep board is swung to a position for discharging the load from the rake head onto the hay stacker head.

What is claimed is—

1. A hay sweep comprising a frame, a rake pivoted to the frame, a lever mounted upon the frame, operative connection between the lever and the rake whereby the latter may be tilted with respect to the frame, a frame mounted upon the rake and adapted for swinging movement thereon, a sweep board carried by the last mentioned frame, and catch means carried by the swinging frame.

2. A hay sweep comprising a frame, a rake pivoted to the frame, a lever mounted upon the frame, operative connection between the lever and the rake whereby the latter may be tilted with respect to the frame, uprights rising from said rake, a swinging sweep board pivotally connected to the uprights, and catch members carried by the sweep board to engage a hay rake head to cause movement of the sweep board upon the backing of the sweep.

3. A hay sweep comprising a frame, a rake pivoted to the frame, a lever mounted upon the frame, operative connection between the lever and the rake whereby the latter may be tilted with respect to the frame, a frame mounted for swinging movement upon the rake, and catch members pivotally connected to the swinging frame and adapted to engage a stationary part to move the swinging frame.

4. A hay sweep comprising a frame, a rake pivotally connected to the frame, means on the frame and adapted to tilt the rake with respect to the frame, a swinging sweep board pivotally connected to the rake, and spring held catcher members carried by the sweep board and adapted to engage a fixed element to cause the swinging of the sweep board to discharge a load from the rake.

In testimony whereof, I affix my signature, in presence of two witnesses.

JOSEPH A. SCHERTZ.

Witnesses:
ERNEST STEGEMAN,
B. H. BOEHMLER.